United States Patent [19]
Ueki et al.

[11] Patent Number: 5,317,345
[45] Date of Patent: May 31, 1994

[54] IMAGE FORMATION APPARATUS HAVING ERASING MEANS RESPONSIVE TO OPERATION STATUS

[75] Inventors: Yoshiharu Ueki, Nara; Fumio Shimazu, Yamatokoriyama, both of Japan

[73] Assignee: Sharp Kabushiki Kaisha, Osaka, Japan

[21] Appl. No.: 799,169

[22] Filed: Nov. 27, 1991

[30] Foreign Application Priority Data

Nov. 29, 1990 [JP] Japan .................. 2-333726
Nov. 29, 1990 [JP] Japan .................. 2-333728

[51] Int. Cl.$^5$ .................. G02F 1/13; B41J 2/445
[52] U.S. Cl. .................. 346/107 R; 359/45; 359/70; 359/62; 359/104; 365/108; 346/108
[58] Field of Search .................. 346/107 R, 108; 359/104, 45, 70, 62; 358/444, 468, 404, 302; 340/799; 395/115, 116; 365/108

[56] References Cited

U.S. PATENT DOCUMENTS

3,796,999  3/1974  Kahn .................. 359/45
4,918,537  4/1990  Mori et al. .................. 359/104

FOREIGN PATENT DOCUMENTS

0322903    7/1989   European Pat. Off. .
49-10036   1/1974   Japan .
49-10037   1/1974   Japan .
59-30537   2/1984   Japan .
63-171064  7/1988   Japan .
64-20773   1/1989   Japan .
2086365    3/1990   Japan .
2218533A   11/1989  United Kingdom .

*Primary Examiner*—Edward L. Coles, Sr.
*Assistant Examiner*—Scott A. Rogers
*Attorney, Agent, or Firm*—David G. Conlin; George W. Neuner

[57] ABSTRACT

An image formation apparatus for selectively storing image data received from image data outputting means in an optical image memory by beam light and printing it out on a recording medium, the image formation apparatus including, clocking means for clocking a predetermined time after completion of printing, and erasing means for erasing contents stored in the optical image memory after the predetermined time is passed.

1 Claim, 6 Drawing Sheets

IMAGE FORMATION APPARATUS HAVING ERASING MEANS RESPONSIVE TO OPERATION STATUS

FIELD OF THE INVENTION

The present invention relates to an image formation apparatus for writing image data in an optical image memory by optical beam, reading the written image, and printing it out.

DESCRIPTION OF THE RELATED ART

U.S. Pat. No. 3,796,999 discloses a display in which laser beam or light selectively illuminates or irradiates a liquid crystal cell and the liquid crystal cell makes an image visible. In this art, the principle is that heat of the laser light is utilized to partially vary a phase of the liquid crystal wherein the image is formed in accordance with an irradiation pattern of the laser light. The liquid crystal cell employed may be a smectic liquid crystal, for example.

Also, Japanese Unexamined Patent Publication No. 20773/1989 discloses a device using the above-mentioned thermal writing liquid crystal cells for forming an image. This art explains: when light transmitted or reflected by the liquid crystal cell illuminates a photosensitive material, a latent image is formed on the photosensitive material; the latent image is utilized to make an image. Therein, three kind of liquid crystal cells are incorporated, for example, images of primary colors, R (red), G (green) and B (blue), are written in the cells, and a full color image is synthesized of the three kind of images.

However, in such a conventional image formation device, there have been problems as follows:

(1) When an image written in an optical image memory is erased just after printing out or before it, there is no sufficient time to overwrite a next image to the optical image memory and edit it.

(2) Assuming that driving power of the image formation apparatus was cut out while the image was stored in the optical image memory, and then when the image formation apparatus is driven again, a new image should be stored in the optical image memory with overlapped with the image written before.

SUMMARY OF THE INVENTION

The present invention provides an image formation apparatus of selectively storing image data received from image data outputting means in an optical image memory by beam light and printing it out on a recording medium, wherein the image formation apparatus comprises clocking means for clocking a predetermined time after completion of printing, and erasing means for erasing the contents stored in the optical image memory after the predetermined time is passed.

Furthermore, the present invention provides an image formation apparatus of selectively storing image data received from image data outputting means in an optical image memory by beam light and printing it out on a recording medium, wherein the image formation apparatus comprises switching means for turning on and off the supply of a driving power to the image formation apparatus, detecting means for detecting off operation of the switching means, and erasing means for erasing the contents stored in the optical image memory when the switching means is turned off.

Still furthermore, the present invention provides an image formation apparatus of selectively storing image data received from image data outputting means in an optical image memory by beam light and printing it out on a recording medium, wherein the image formation apparatus comprises detecting means for detecting that new image data is input from image data outputting means to a printer; and erasing means for erasing the contents stored in the optical image memory on receiving an output of the detecting means.

The optical image memory may be any kind of memory storing an image which is susceptible or recognizable when it is irradiated with light and which can be read even if the irradiation is repetitively performed (unless erasing is performed). Specifically, a memory, which is distinguished from a photoconductor drum in an ordinary copying machine, may be made of liquid crystal, electrochromy, PLZT (a compound of Pb, La, Zr, and Ti) and the like.

Preferably, the optical image memory is composed of a liquid crystal cell using a liquid crystal showing a smectic C phase or a mixed liquid crystal of nematic and cholestric. Further preferable are those having, in the point of structure of this liquid crystal, a structure disclosed in, for example, U.S. Pat. No. 3,796,999 in which a heat storage layer is laminated to the liquid crystal and a structure of a light writing type device disclosed in, for example, Japanese Unexamined Patent No. 10036/1974 or No. 10037/1974 in which a photoconductor layer is laminated are read. The liquid crystal cell may be a reflecting type cell or a transmitting type cell. These optical image memories are assumed to be able to store the image, if once stored, for few hours to several tens of days even if it is left intact or let alone.

As beam light used to write image data to the optical image memory, laser beam from a laser diode or light from an LED is used, which irradiates an image region of the optical image memory by scanning or the whole surface irradiation in accordance with desired image data.

DETAILED DESCRIPTION OF THE PREFERRED EMBODIMENT

Figure 1:
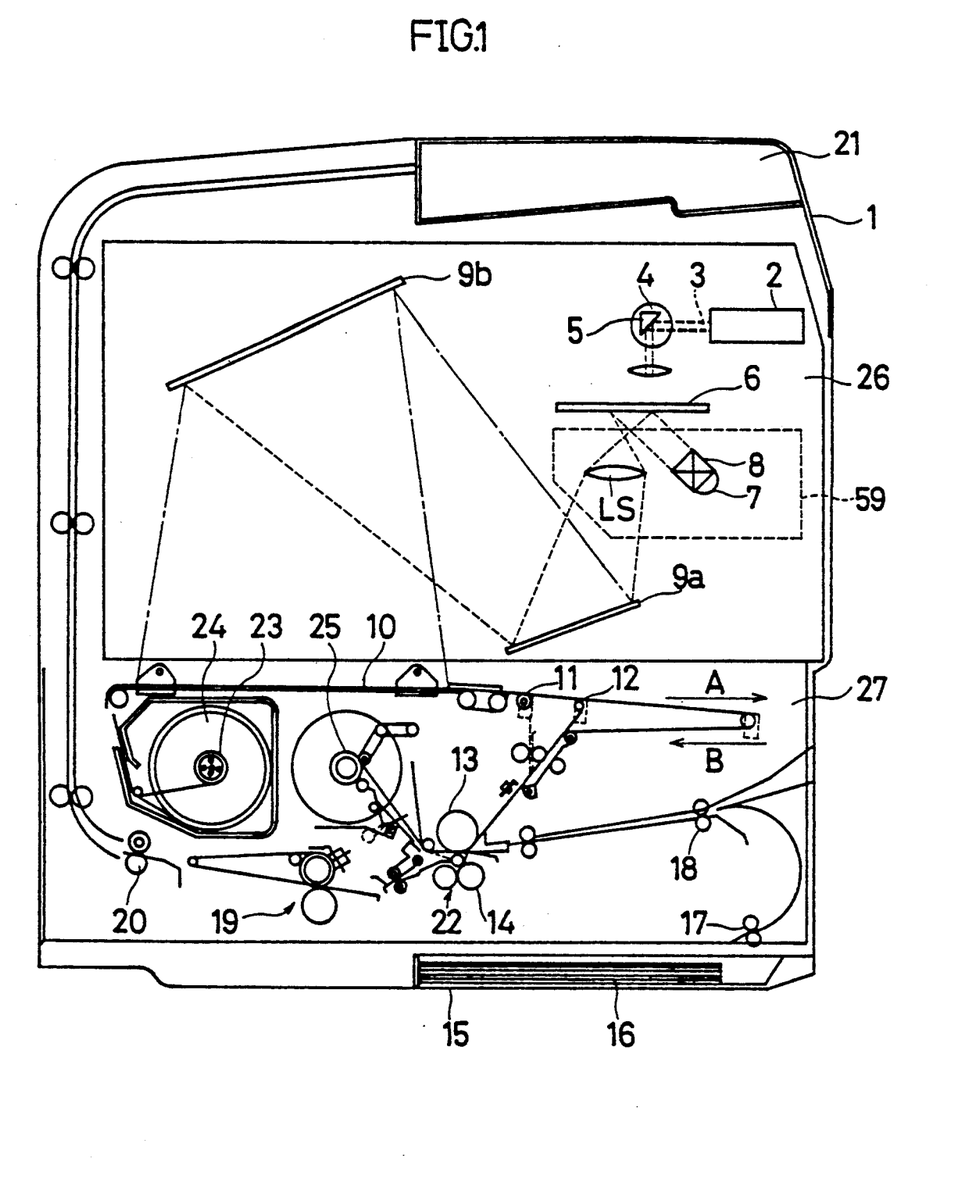
FIG. 1 is a view showing a structure of an image formation apparatus in accordance with an embodiment of the present invention.

FIG. 1 is a schematic view showing a structure of an image formation apparatus in accordance with an embodiment of the present invention. In the image formation apparatus, a photosensitive sheet (media sheet) coated with a microcapsules each containing an optical curing material and a dye and an image receiving sheet coated with a thermoplastic resin defining a developing material which forms a color in reaction to the dye are used.

The image formation apparatus is roughly composed of upper and lower parts; one is an image writing and exposure unit 26 and another is a developing unit 27. The image writing and exposure unit 26 comprises a laser diode 2 which outputs laser beam 3, a rotary encoder motor 4, a first scanning mirror 5, a liquid crystal cell unit 6, an exposure optical system 59 and a mirror 9a on the right side. The exposure optical system 59 comprises an exposure lamp (for example, halogen lamp) 7, a color filter unit 8 and a lens LS. In addition, a mirror 9b is arranged on the upper left side. The media sheet 24 on the left side in the developing unit 27 has been wound to a supplying shaft 23 and then it is carried through a carrying path and wound up to a winding shaft 25. There are arranged an exposing plate 10, an automatic feeding roller 11, a buffer roller 12 and pressuring rollers 13 and 14 along the carrying path of the media sheet 24 from the supplying shaft. On the lower right side, a cassette 15 is provided, in which an image receiving sheet 16 is housed. There are provided a supply roller 17, a timing roller 18 on a carrying path of the image receiving sheet 16 from the cassette 15 to a pressure developing unit 22. On the left of the pressure developing unit 22 provided is a lustering device 19, and on the left of it, a paper discharging roller 20 is placed. On top of a body 1, a paper discharging unit 21 is provided.

Figure 2:
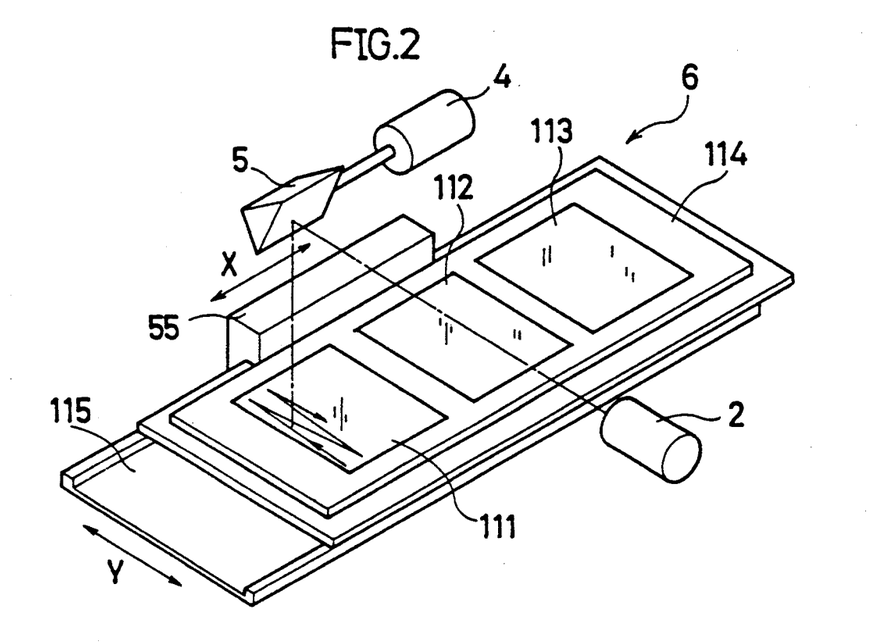
FIGS. 2 and 3 are each views showing a major portion of the structure of the embodiment shown in FIG. 1.
Figure 3:
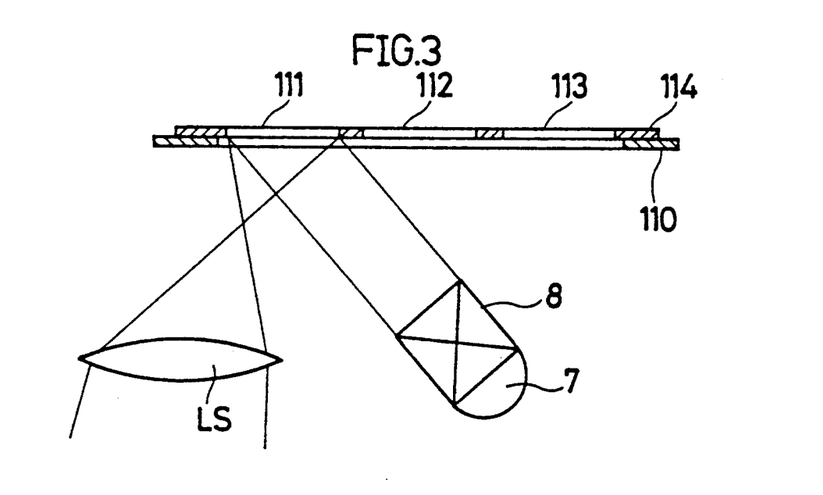

FIGS. 2 and 3 each show a major portion of FIG. 1. As shown in these figures, three liquid crystal cells, that is a first cell 111, a second cell 112 and a third cell 113 of the liquid crystal cell unit 6 are fit in a frame 114, which is supported by a liquid crystal supporter 110. The liquid crystal supporter 110 is held by an X-axis direction moving mechanism 115 and can be moved in an X-axis direction (secondary scanning direction) shown by an arrow. The movement is accurately carried out by a linear encoder motor (a linear motor combined with a linear encoder) 55. Above the liquid crystal supporter 110, a writing device including a laser diode 2, a primary scanning mirror 5 and a rotary encoder motor (a motor combined with a rotary encoder) 4 is placed. At the time of image writing, when the mirror 5 reciprocally pivots while the supporter 110 is moved in the X-axis direction, laser beam scans the liquid crystal cell in the Y-axis direction (primary scanning direction) as shown by an arrow drawn on the liquid crystal cell 111 in FIG. 2, so that the image is written.

The color filter unit 8 of the exposure optical system 59 comprises a color separating filter and a shutter (which are not shown). Each time the liquid crystal supporter 110 moves in the X-direction (shown in FIG. 2) and each of the liquid crystal cells reaches a specified position, the shutter of the color filter unit 8 opens and the liquid crystal cells 111 to 113 are planarly scanned, and reflected light from them is led through a lens LS to the exposure plate 10 to expose the media sheet 24 to light. In the liquid crystal cells 111 to 113, images of R (red), G (green) and B (blue) are written. The color separating filter of the color filter unit 8 selectively transmits light of specific colors; for example, there are three filters: a R filter transmitting wavelength of red, a G filter transmitting wavelength of green and a B filter transmitting wavelength of blue. The filter switches to the R filter transmitting the wavelength of red when the liquid crystal cell having a R image is read, to the G filter transmitting the wavelength of green when the liquid crystal cell having a G image is read, or to the B filter transmitting the wavelength of blue when the liquid crystal cell having a B image is read. The R, G and B filters are attached onto a disc rotated by a motor (not shown), and a specified filter can be positioned on an optical axis of the lamp 7 by a slit engraved on the disc. In addition, the shutter is also formed of a disc having an opening which is rotated by a motor (not shown), and the opening and closing of the shutter is detected through the slit engraved on the disc.

When red, green and blue light reflected from the liquid crystal cell unit 6 illuminates the media sheet 24 on the exposure plate 10 through the lens LS and mirrors 9a and 9b, the buffer roller 12 is moved in the direction shown by an arrow A. A selectively hardened image is formed on the media sheet 24 through exposure. The media sheet 24 may be a full color type photosensitive and pressure sensitive sheet disclosed in Japanese Unexamined Patent Publication No. 30537/1984, which is coated with three kinds of micro capsules uniformly dispersed: (1) microcapsules loaded with a photo-hardening material sensitive to red light and dye developing cyanogen, (2) micro capsules loaded with a photo-hardening material sensitive to green light and dye developing Megenta and (3) micro capsules loaded with a photo-hardening material sensitive to blue light and dye developing yellow.

After exposure, the winding shaft 25 is rotated to move the buffer roller 12 in the direction shown by an arrow B and the media sheet 24 on which the selective hardened image is carried to the pressure developing part 22. On the other hand, the image receiving sheet 15 is supplied one by one from the cassette 16 and carried by the supplying roller 17 and then stops and waits at a timing roller 18. When the buffer roller 12 stars to move to the direction shown by the arrow B, the image receiving sheet 16 which was waiting is sent to the pressure developing unit 22 by the timing roller 18 in response to the image on the media sheet 24.

The media sheet 24 and the image receiving sheet 16 are pressed by the pressing rollers 13 and 14 with one of the sheets overlaid with the other. This causes microcapsules on the media sheet which are not hardened are crashed, and the dye in the capsules flows out and reacts to the developing material on the image receiving sheet to form a color. After the pressure development, the media sheet 24 is wound up to the winding shaft 25 and the image receiving sheet is subjected to a heat treatment at the lustering device 19 and then carried by the paper discharging roller 20 and discharged to the paper discharging part 21.

Figure 4:
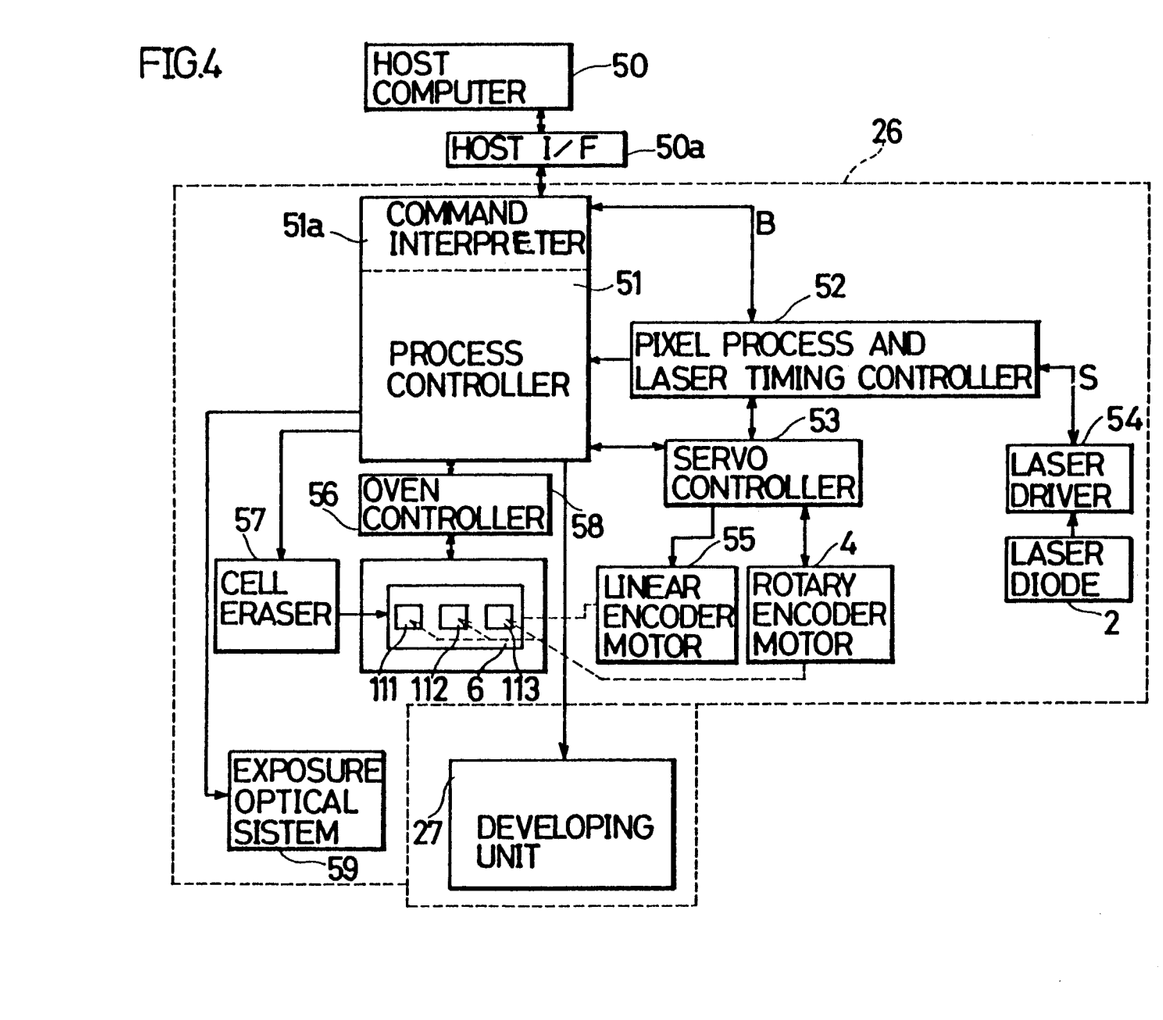
FIG. 4 is a block diagram showing a control part of the embodiment shown in FIG. 1.

FIG. 4 is a block diagram showing a control circuit of the image writing and exposure unit 26, with which control operation of this embodiment of the present invention will be described.

After a command which is sent in advance of actual image data is analyzed at a command interpreter unit in a process controller 51, image data which is sent from a host computer 50 through a host interface 50a is sent to a pixel process and laser timing controller 52 through an inner pixel bus B on the basis of the above result. In the pixel process and laser timing controller 52, the image data is processed and laser-on-timing is adjusted. In processing the image data, the original image data sent from the host computer 50 is corrected in order to improve color repeatability, color matching, gradient and other image qualities of the printed image. This correction algorithm is determined so that a better image quality may be obtained with due regard to an influence exerted on each reproduced image quality by the media sheet 24, the developing unit 27 and the image writing and exposure unit 26. In adjusting the laser-on-timing, a laser drive signal S is provided to a laser driver 54 at an appropriate timing and at the laser-on-timing corresponding to the image data with regard to timing with a servo controller 53 to be described later and then a laser diode 2 emits light. The laser beam from the laser diode 2 is reflected by the primary scanning mirror 5 attached to a shaft of the rotary encoder motor 4 and illuminates the liquid crystal cell unit 6. The liquid crystal cell unit 6 is moved in the secondary scanning direction by the linear encoder motor 55 as described above. The image is written on the cells 111 to 113 on the liquid crystal cell unit 6 by combining scanning in the primary scanning direction of the laser beam by the rotary encoder motor 4 with scanning in the secondary scanning direction by the linear encoder motor 55. Each of the rotary encoder motor 4 and the linear encoder motor 55 is monitored by a rotary encoder and a linear encoder, respectively which are combined in them and on the basis of this position information the servo controller 53 controls a drive necessary to write the image. In addition, the position information obtained from each encoder (of rotary and linear encoders) is also sent to the pixel process and laser timing controller 52 and used to control on-timing of the laser diode 2.

The image information written on the liquid crystal cells 111 to 113 is read by the exposure optical system 59 and the media sheet 24 is irradiated with light containing the image information. More specifically, the exposure optical system 59 receives a signal from the process controller 51 and then the liquid crystal cell unit 6 is irradiated with light from the exposure lamp 7 through the color filter unit 8 and its reflected light is led to the media sheet 24 through the lens LS.

Figure 5:
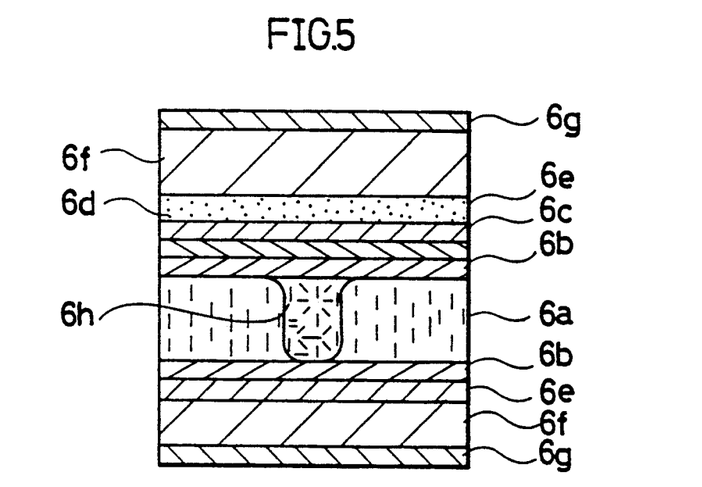
FIG. 5 is a view for explaining a major portion of a liquid crystal cell.

The liquid crystal cell used in this embodiment of the present invention is a reflecting type cell written by laser heat. The liquid crystal cell used in a laser heat writing system is called a liquid crystal light bulb, in which a transparent electrode 6e is formed on the inner whole surface of two glass substrates 6f which sandwich a smectic liquid crystal layer 6e. An absorbing layer 6d for laser beam is formed on one substrate. When laser beam narrowed to approximately 10 microns illuminates the liquid crystal cell, the absorbing layer 6d absorbs the laser beam and generates heat. When the heat is transmitted to the liquid crystal layer 6a, only a part 6h irradiated with the laser beam changes from a smectic (S) phase to an isotropic liquid (I) phase through a nematic (N) phase. When the laser beam is moved to another place, a temperature abruptly drops and a light scattering orientation structure is formed in the process of changing as follows, that is, I phase→N phase→S phase. In addition, the liquid crystal cell is in the smectic phase at an operating temperature of the liquid crystal layer 6a and it is put in an oven 58 so that its phase may be changed to the isotropic liquid phase by energy of the laser beam, which oven is controlled by an oven controller 56 so that a temperature in it keeps at approximately 51° C. The liquid crystal which is not irradiated with the laser beam has a transparent orientation structure and once formed light scattering orientation structure stably exists with the transparent orientation structure. Thus, while a light scattering pixel is written in the liquid crystal layer by irradiation of laser beam, an image having gradation is written by scanning the liquid crystal cell while modulating a strength of the laser beam (modulating a pulse width of a pixel unit). When light is irradiated to the liquid crystal cell in which the image is written from an opposite side, the light transmits the liquid crystal layer 6a and is regularly reflected (mirror reflection) on the light reflective layer 6c at a part which is not irradiated with the laser beam, while the light scatters at a part which is irradiated with the laser beam. Thus, reflected light having a shaded image can be obtained from the liquid crystal cell unit 6. In addition, it is necessary to change all orientations to the transparent orientation in order to erase the image once written in the liquid crystal cell. The image is erased as follows. That is, the light scattering orientation structure written by a change of temperature caused by irradiation of the laser beam on the liquid crystal cell is oriented again when a high electric field above a certain threshold value is applied, and returns to the original transparent orientation structure. Thus, the light scattering image on the liquid crystal cell is all erased. According to this embodiment of the present invention, a rectangular wave voltage of approximately ±200 V is applied to both ends of the transparent electrode 6e by a cell eraser 57, whereby a high electric field is generated on the liquid crystal layer and then the image is all erased.

Figure 6:
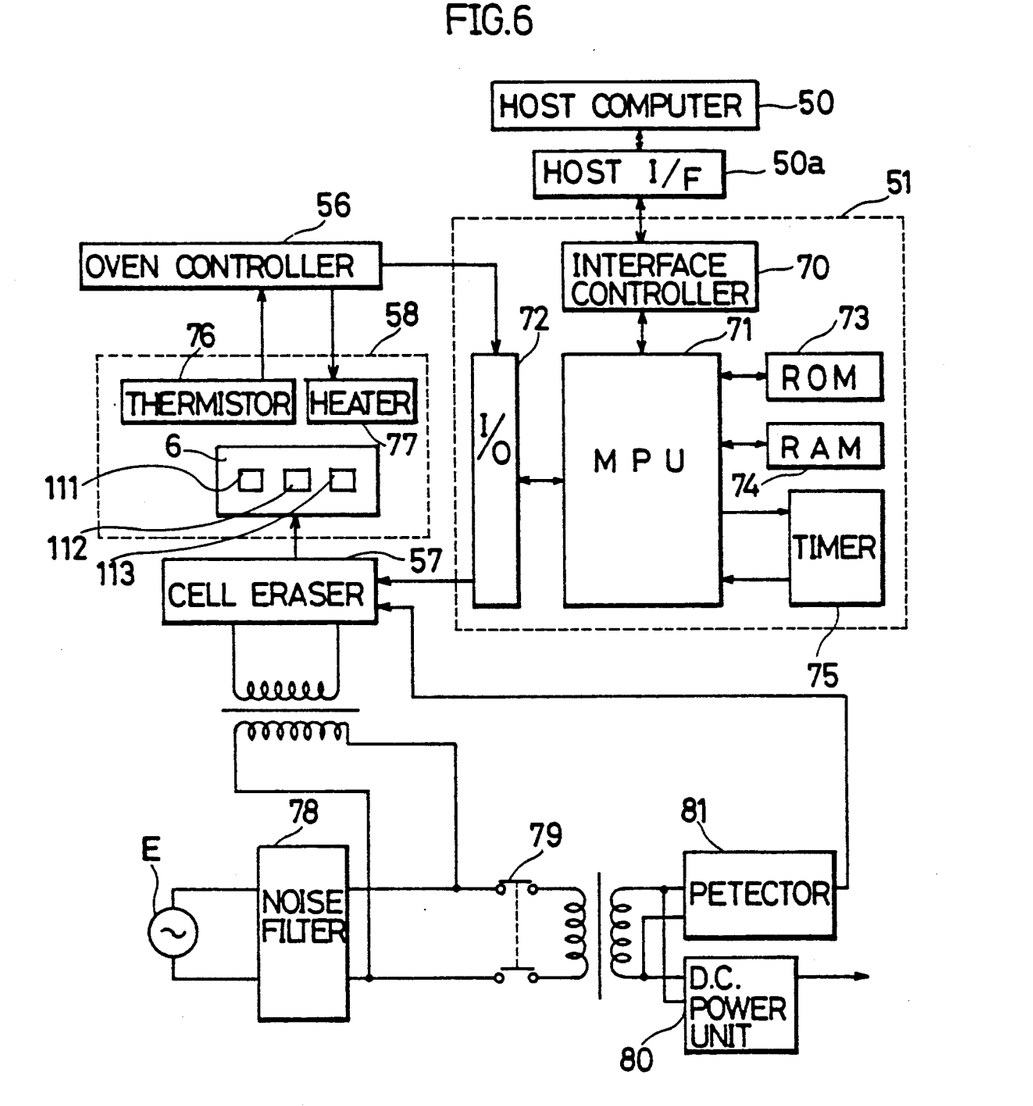
FIG. 6 is a block diagram showing a major portion of FIG. 4 in detail.

FIG. 6 is a view showing a major portion of the block diagram of FIG. 4. Referring to FIG. 6, reference numeral 51 designates a process controller, reference numeral 71 designates an MPU for controlling operation of the controller in accordance with sequence previously programmed in a ROM 73, reference numeral 74 designates a RAM used as a working memory necessary for that control, reference numeral 70 designates an interface controller which sends or receives a command and image data to or from the host computer 50 in accordance with a predetermined interface protocol, reference numeral 72 designates an I/O driver which outputs a control signal to the oven temperature controller 56 and the cell erase controller 57 in accordance with a command of the MPU 71, and reference numeral 75 designates a timer returning a timer count up (carry) signal to the MPU 71 when a predetermined time is passed after a time set value is loaded from the MPU 71 and counting is started. The oven temperature controller 56 detects a temperature in the oven 58 by a thermistor 76 and controls a heater 77 so that the temperature in the oven may be kept at a constant temperature. This control temperature is set at approximately 51° C. so that the liquid crystal cell of the liquid crystal cell unit 6 set in the oven 58 can be kept in the smectic phase (S phase), that is, set at an optimal temperature for image writing by the laser beam and image erasing by the cell eraser 57. The cell eraser 57 erases the image by applying an a.c. voltage of a rectangular wave to both ends of the transparent electrode 6e of the liquid crystal cell unit 6 in accordance with a command from the I/O driver 72.

A power is supplied to an AC power supply E from the outside of the apparatus. Then, it is supplied to a DC power supply unit 80 through a noise filter 78 and a power supply switch 79. The DC power supply unit 80 supplies a necessary DC power to the process controller 51, the oven controller 56 and others in the apparatus. The AC power supply is connected to a power supply switch 79 and also connected to a power supply off detector 81, which detector detects that the power supply switch 79 is turned off and outputs a power off signal to the cell eraser 57. Since the cell eraser 57 is connected to the AC power supply not through the power supply switch 79, its operation can be guaranteed even when the power supply switch 79 is off.

Figure 7:
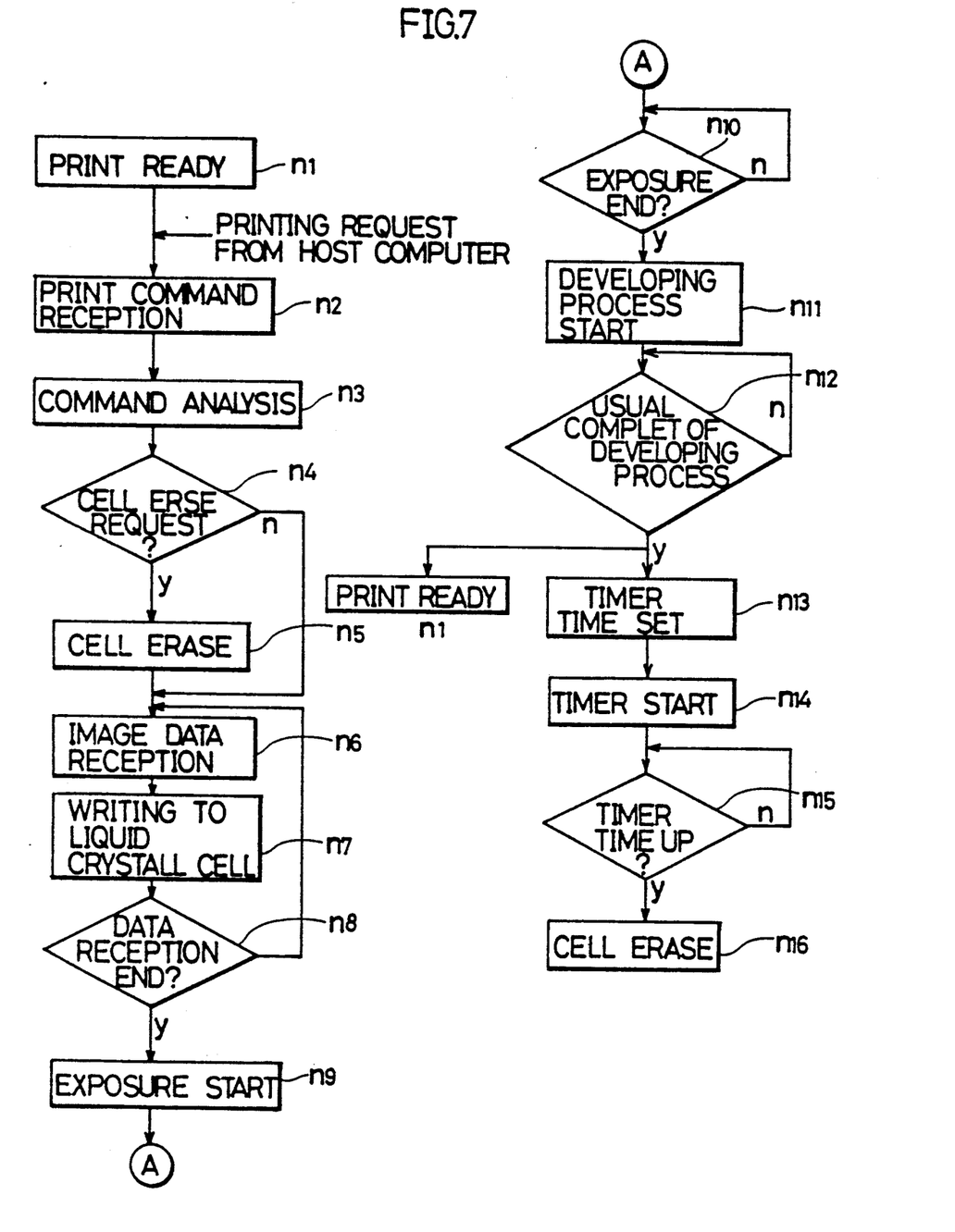
FIG. 7 is a flowchart for explaining operation of the embodiment shown in FIG. 1.

Next, cell erasing process of this embodiment of the present invention will be described using a flowchart in FIG. 7. The host computer 50 issues a command to request printing after confirms that the image formation apparatus is in a print ready state (step n1). In the image formation apparatus the command is received (step n2) and then it is sent to a command analyzing unit (step n3) and analyzed therein. If a command to erase a cell is contained in that command, a cell is erased by the cell eraser 57 (steps n4 and n5) in advance of reception of image data. However, this cell erasing process in advance of reception of image data is not always necessary. Then, image data is received in accordance with the printing command and an image is written in the liquid crystal cell (steps n6 to n8). After the image data is received and written in the liquid crystal cell, the media sheet is exposed to light. After exposure, developing process is implemented and the image receiving sheet 16 on which the image is formed is discharged to the outside of the apparatus, when the printing process is ordinarily completed (steps n9 to n12). When the printing process is ordinarily completed, the MPU 71 sets a timer at N and then the timer is started. When the time N is passed, the timer 75 returns a time-up signal to the MPU 71. Then, the MPU 71 issues a command for the cell eraser 57 to erase the cell through the I/O driver 72 and then the cell is erased. In addition, a value of the time N is determined on the basis of the following operational specification of the image formation apparatus. After an operator of the host computer 50 completes printing once, in a case where the same image left of the cell is printed again, if the time N is too short, the image on the liquid crystal cell is erased before the printing operation is started. In this case, it is necessary to send the image data again. Therefore, it is preferable to take an appropriate time before the cell is erased, for example a few minutes. As a result, the image on the cell which is formed by the previous printing process can be used again for printing and it can be prevented that the state of the liquid crystal cell is forgotten because the image formation apparatus is not accessed for a long time and printing of a new image is started before the cell is erased. In addition, in a case where the image left on the cell is not used again after printing is completed once, the time N may be set at 0. In this case, the steps n4 and n5 in FIG. 7 are not necessary and the liquid crystal cell is always in an erasing state when printing is started. In addition, in a case where another new image is printed just after the previous printing process is completed, a command to erase the cell should be contained in the printing command (steps n4 and n5).

As described above, an image transmitting time required when the operator forgets to erase the cell and printing expenses can be saved by automatically erasing the liquid crystal cell when an appropriate time is passed after completion of the printing process. In addition, by appropriately setting the time N, a function of cell erasing which meets the operational specification of the apparatus can be implemented.

Meanwhile, in this kind of image formation apparatus, when the power supply switch of the apparatus is turned off before the image of the cell is erased, the following problems arise. That is, a light scattering image is left on the cell when the liquid crystal cell is not at an operating temperature (approximately 51° C.) in the above case, and then the cell is not completely erased even if the cell is erased at next time, causing an image offset, which is a problem in view of reliability of the apparatus. In addition, if the image data is left in an operator's absence, a secret of the image data could leak or double writing of the image could be generated at the first image writing after turning on of the power supply of the apparatus. However, according to this embodiment of the present invention, since the power supply off detector 81 always watches generation of off state of the power supply switch 79 of the apparatus, when the power supply switch 79 is turned off, a power off signal is output to the cell eraser 57. When the cell eraser 57 detects the power off signal, a light scattering image on the liquid crystal cell is erased. In addition, since the AC power supply is connected to the liquid crystal cell controller 57 not through the power supply switch 79, its operation is guaranteed. As a result, when the power supply of the apparatus is turned off, the image is always erased, whereby the above problems can be solved.

According to the present invention, after printing there is allowance time before an image of an optical image memory is erased, so that the next image can be continuously written and then the image can be edited on the optical image memory. In addition, in the case where supply of power to the image formation apparatus is cut, the image of the optical image memory is surely erased and only a new image can be written in the optical image memory when the image formation apparatus is driven again, which is very convenient.

Further, in the case where double writing of the image to the liquid crystal cell is only prevented, there may be only provided a sequence which detects reception of new image data and then erases the liquid crystal cell in the process controller 51. By providing such sequence in the process controller 51, when the new image data is sent from the host computer 50 through the host interface 50a, the process controller 51 sends the data to the laser timing controller 52 while sending an instruction to the cell eraser 57, whereby the image is completely erased before the liquid crystal cell unit 6 is irradiated with laser beam. As a result, double writing of the liquid crystal cell can be prevented.

While only certain presently preferred embodiments have been described in detail, as will be apparent with those skilled in the art, certain changes and modifications can be made without departing from the scope of the invention as defined by the following claims.

What is claimed is:

1. An image formation apparatus for selectively storing image data received from image data outputting means in an optical image memory by beam light and printing it out on a recording medium, said image formation apparatus comprising:

clocking means for clocking a predetermined time period after every completion of printing;

said image data outputting means outputting command data prior to the image data,     detecting means for detecting whether the command data contains an erase command; and     erasing means for erasing the contents stored in the optical image memory when the predetermined time period has passed or the erase command is detected.

* * * * *